US008620288B2

(12) United States Patent
Sharma et al.

(10) Patent No.: US 8,620,288 B2
(45) Date of Patent: Dec. 31, 2013

(54) TARGETED MOBILE CONTENT INSERTION AND/OR REPLACEMENT

(75) Inventors: Ranjan Sharma, New Albany, OH (US); Shishir C. Modi, Pickerington, OH (US)

(73) Assignee: Alcatel Lucent, Paris (FR)

( * ) Notice: Subject to any disclaimer, the term of this patent is extended or adjusted under 35 U.S.C. 154(b) by 1495 days.

(21) Appl. No.: 11/985,697

(22) Filed: Nov. 16, 2007

(65) Prior Publication Data

US 2009/0131025 A1 May 21, 2009

(51) Int. Cl.
*H04L 29/06* (2006.01)

(52) U.S. Cl.
USPC ............ 455/414.3; 455/405; 705/14.42; 705/14.55; 705/35; 705/39; 715/234

(58) Field of Classification Search
USPC ......... 455/414.2, 414.1, 456.1, 566, 88, 557, 455/405, 414.3; 715/238, 234; 709/217, 709/200; 707/803, 733; 705/14.42, 14.55, 705/35, 39
See application file for complete search history.

(56) References Cited

U.S. PATENT DOCUMENTS

| | | | |
|---|---|---|---|
| 6,035,281 A * | 3/2000 | Crosskey et al. | ......... 705/14.69 |
| 6,487,538 B1 | 11/2002 | Gupta et al. | |
| 6,751,608 B1 * | 6/2004 | Cohen et al. | ........................ 1/1 |
| 6,782,003 B1 * | 8/2004 | Giroux et al. | ................ 370/466 |
| 7,249,197 B1 * | 7/2007 | Roestenburg et al. | ....... 709/246 |
| 2002/0046184 A1 * | 4/2002 | Villaret et al. | ................. 705/64 |
| 2002/0065779 A1 * | 5/2002 | Dutta | .............................. 705/57 |
| 2002/0077897 A1 | 6/2002 | Zellner et al. | |
| 2003/0074672 A1 * | 4/2003 | Daniels | ......................... 725/110 |
| 2004/0102182 A1 | 5/2004 | Reith et al. | |
| 2004/0224662 A1 * | 11/2004 | O'Neil et al. | ................. 455/408 |
| 2005/0164739 A1 * | 7/2005 | Goldberg et al. | ............ 455/558 |
| 2005/0192922 A1 * | 9/2005 | Edlund et al. | ..................... 707/1 |
| 2005/0204035 A1 * | 9/2005 | Kalish | ........................... 709/224 |
| 2006/0031404 A1 * | 2/2006 | Kassab | ......................... 709/218 |
| 2006/0031415 A1 | 2/2006 | Serena | |
| 2006/0206568 A1 * | 9/2006 | Verma et al. | ................. 709/206 |
| 2007/0061300 A1 * | 3/2007 | Ramer et al. | ...................... 707/3 |

(Continued)

FOREIGN PATENT DOCUMENTS

| | | |
|---|---|---|
| JP | 2002530700 | 9/2002 |
| JP | 2002535689 | 10/2002 |

(Continued)

OTHER PUBLICATIONS

International Search Report, Oct. 9, 2009.
Korean Office Action (English Translation) dated Oct. 12, 2011.

*Primary Examiner* — Mahendra Patel

(74) *Attorney, Agent, or Firm* — Fay Sharpe LLP

(57) ABSTRACT

A method is provided for altering content of a webpage served from a content provider's server (32). The method includes: receiving a data request at a proxy server (22) over a wireless telecommunication network (20), the data request being initiated by a mobile device (10) served by the wireless network (20); forwarding the request from the proxy server (22) to the content provider's server (32) over the Internet (30) such that the content provider's server (32) returns a webpage with original content contained therein in response to the forwarded request; receiving the returned webpage at the proxy server (22); altering the original content of the webpage received by the proxy server (22); and, forwarding the webpage with the altered content to the mobile device (10) initiating the data request.

22 Claims, 1 Drawing Sheet

(56) References Cited

U.S. PATENT DOCUMENTS

| | | |
|---|---|---|
| 2007/0061336 A1* | 3/2007 | Ramer et al. .................... 707/10 |
| 2007/0180147 A1* | 8/2007 | Leigh ........................... 709/246 |
| 2007/0204223 A1 | 8/2007 | Bartels et al. |
| 2007/0287473 A1* | 12/2007 | Dupray ...................... 455/456.1 |
| 2008/0072139 A1* | 3/2008 | Salinas et al. ................. 715/238 |
| 2009/0083232 A1* | 3/2009 | Ives et al. ......................... 707/3 |

FOREIGN PATENT DOCUMENTS

| | | |
|---|---|---|
| JP | 2004287996 | 10/2004 |
| KR | 20050101332 | 10/2005 |
| KR | 20060088439 | 8/2006 |
| KR | 1020070009267 | 1/2007 |
| WO | WO 00/30002 | 5/2000 |
| WO | WO 2004072761 | 8/2004 |

* cited by examiner

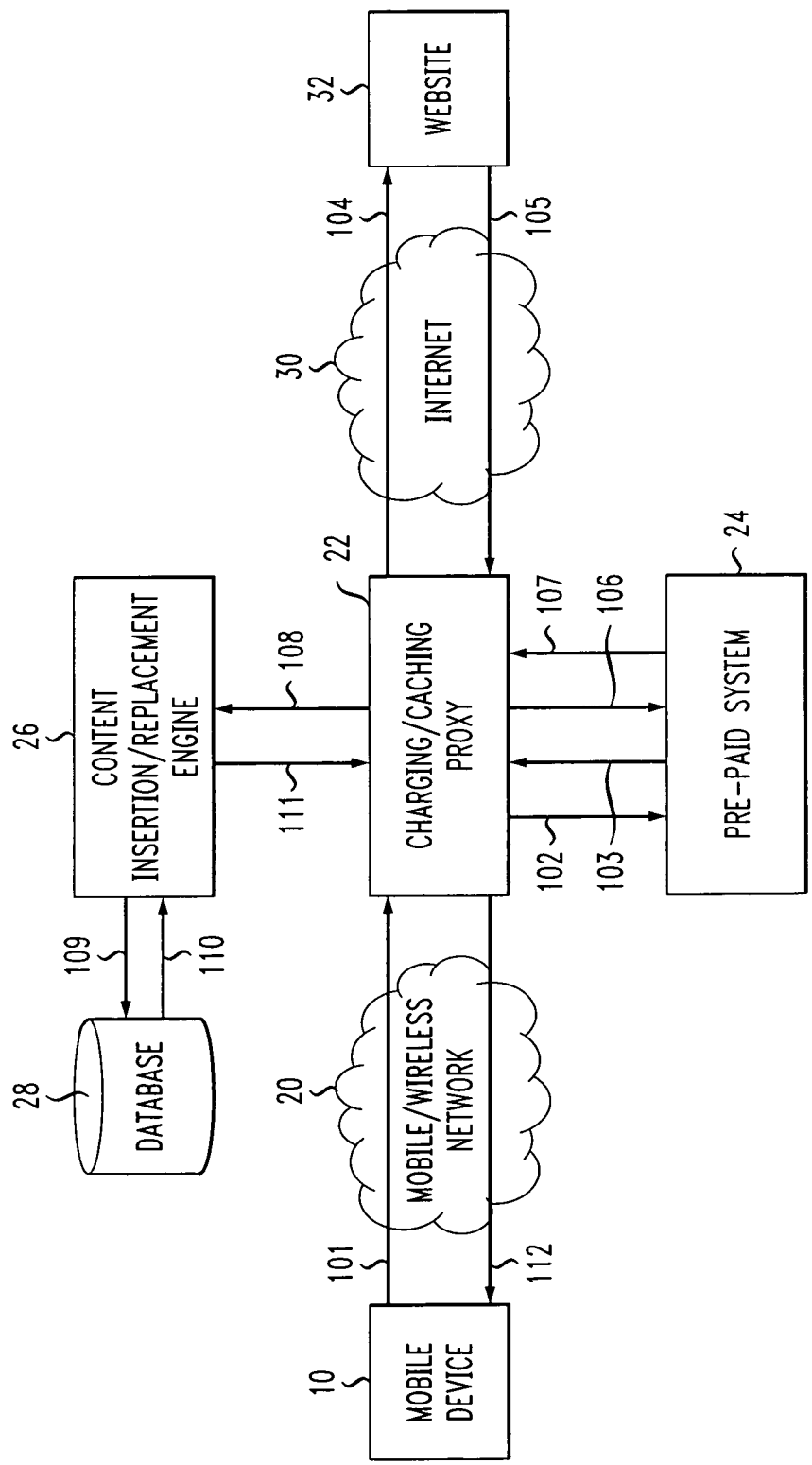

TARGETED MOBILE CONTENT INSERTION AND/OR REPLACEMENT

FIELD

The present inventive subject matter relates to the art of mobile and/or wireless telecommunications. Particular application is found in conjunction with certain types of mobile and/or wireless networks and/or mobile stations or user equipment (UE), and the specification makes particular reference thereto. However, it is to be appreciated that aspects of the present inventive subject matter are also amenable to other like networks, devices and/or applications.

BACKGROUND

Various types of mobile telecommunication networks and associated standards, services and/or protocols are generally known in the art. Examples include GSM (Global System for Mobile communications), GPRS (General Packet Radio Service), UMTS (Universal Mobile Telecommunications System), CDMA (Code Division Multiple Access), etc. A cellular or wireless telephone, smart phone, personal digital assistant (PDA), etc. is a common example of a mobile station (MS) or wireless UE or similar mobile device employed by a wireless telecommunication subscriber or user to access a mobile network.

Commonly, various networks and/or UE are equipped or otherwise provisioned to support the access of data or content from suitable data/content providers. For example, a subscriber can employ their mobile device to request data or content from a website over the Internet. That is to say, wireless telecommunication service providers often provide some form of data and/or Internet access to the subscribers. Accordingly, the subscribers are able to retrieve or otherwise receive data or content on their mobile devices, e.g., from websites and/or other like content providers, via the Internet. Often times, the webpages or documents or other like content statically or dynamically generated at an Internet content provider's server will include advertisements or the like which are delivered with the rest of the content. Mobile advertising, especially if it is targeted to specific subscribers, has great potential for wireless service providers. Nevertheless, a suitable solution for effectively and/or efficiently capitalizing on mobile advertising present certain difficulties and has heretofore been undeveloped. One difficulty is, for example, that in contrast to traditional web or mobile webpages generated by the content provider's hosting server, effective and efficient targeted advertisement delivery to a mobile device generally demands that an end-user's interests, optionally their past history and mobile device characteristics and/or capabilities are taken into account.

Accordingly, a new and improved method and/or system for content insertion and/or replacement is disclosed that overcomes the above-referenced problems and others.

SUMMARY

In accordance with one embodiment, a method is provided for altering content of a webpage served from a content provider's server. The method includes: receiving a data request at a proxy server over a wireless telecommunication network, the data request being initiated by a mobile device served by the wireless network; forwarding the request from the proxy server to the content provider's server over the Internet such that the content provider's server returns a webpage with original content contained therein in response to the forwarded request; receiving the returned webpage at the proxy server; altering the original content of the webpage received by the proxy server; and, forwarding the webpage with the altered content to the mobile device initiating the data request.

In accordance with another embodiment, a telecommunication network is provided that supports altering content of a webpage served from a content provider's server. The network includes: a mobile portion used by a mobile device to wirelessly access the network; a proxy server that receives a data request from the mobile device over the mobile portion of the network and forwards the request to the content provider's server over the Internet such that the content provider's server returns to the proxy server a webpage with original content contained therein in response to the forwarded request; and, a content alteration engine that receives the webpage with the original content from the proxy server, alters the original content of the webpage, and returns the webpage with altered content to the proxy server, which in turn forwards the same to the mobile device that initiated the data request.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

The FIGURE is a block diagram illustrating an exemplary configuration of a telecommunications network utilizing a convergent charging solution which may suitably be utilized for practicing aspects of the present inventive subject matter.

DETAILED DESCRIPTION OF PREFERRED EMBODIMENTS

For clarity and simplicity, the present specification shall refer to structural and/or functional elements, relevant communication standards, protocols and/or services, and other components that are commonly known in the art without further detailed explanation as to their configuration or operation except to the extent they have been modified or altered in accordance with and/or to accommodate the preferred embodiment(s) presented herein.

Generally, the present specification describes a method and/or system that allows a mobile telecommunication service provider to replace or insert selected content, e.g., advertising, tag lines, or the like, as data is delivered to or flows back to a mobile device of a subscriber requesting the data from an Internet or other like content provider that fulfills the request. The content inserted or substituted is optionally dynamically determined based on a set of rules defined by the wireless service provider. Suitably, the content insertion and/or substitution in the proposed approach is executed in real-time and is outside of the control of the content provider's server which originally responded to the data request. This is in sharp contrast to conventional approaches, wherein the content provider generally pushes all the content to the requesting mobile devices, i.e., including the advertising which is typically already incorporated in the data stream being sent from the content provider's server to the mobile device of the subscriber. Nevertheless, mobile operators and/or service providers that are generally more familiar with the subscriber may be in a better position to more accurately target advertising to the subscriber, e.g., based on (but not limited to) the following criteria: a) the specific data request; b) a subscriber profile accessible by the service provider; c) mobile device or UE location; and/or, d) specific policies maintained for specific subscribers.

In one suitable embodiment, the method and/or system provides for localization of the inserted and/or substitute advertising or other like content. For example, if an original document or webpage from a content provider's server contained an advertisement for a local business relative to the content provider's geographic location, the content substitution feature of the present method and/or system may be optionally utilized by a wireless telecommunication service provider to replace that advertisement with another advertisement for a local business relative to the mobile device's geographic location. More specifically, e.g., a subscriber based in New York, N.Y., might request a webpage, document or other like content that originates from a server fulfilling the request in Seattle, Wash., and accordingly the server generating the webpage or document may include an advertisement for a Seattle business. Nevertheless, in accordance with the present approach, the wireless telecommunication service provider (knowing the location of the mobile device to which the content is being delivered) may employ the content substitution feature to replace the aforementioned Seattle business advertisement with another more suitably targeted advertisement, e.g., for a New York business. Many available techniques may be used to determine the location of the mobile device, however, in one exemplary embodiment, the IP (Internet Protocol) address of the requesting mobile device is associated with a particular geographic region, e.g., a city.

With reference now to the FIGURE, wireless telecommunication service providers generally provide data and/or Internet access to mobile subscribers on either a pre-paid basis or a post-paid basis. However, it is advantageous to have a convergent or unified charging solution to monitor and/or record data access and/or Internet usage for billing purposes in both cases. For example, the FIGURE illustrates one such suitable network configuration which employs a solution developed by Alcatel-Lucent known as Instant Convergent Charging (ICC). As shown in the FIGURE, the mobile device 10 is provided in the usual manner with telecommunication services via a suitable wireless network 20.

An exemplary process for the handling of a data request from a pre-paid subscriber will now be described with reference to the FIGURE, wherein the numbered lines illustrated in the FIGURE represent the correspondingly numbered steps. It is assumed of the FIGURE that the data access is for a pre-paid subscriber so that the relatively more complicated scenario as between pre-paid and post-paid subscriber access to data can be illustrated. Note that in the case of post-paid subscribers, the sequence of steps could be suitably simplified, as noted below.

In step 101, a data request from the mobile device 10 of the subscriber is routed via the network 20 to a charging/caching proxy server 22. In step 102, the proxy 22 sends an authorization request to a pre-paid authorization/accounting system 24 (e.g., implemented in and/or supported by a service control point (SCP) of the network 20) which checks if the associated pre-paid account of the subscriber has sufficient funds and/or balance available, e.g., to satisfy the resulting charges for complying with the corresponding data request. Note that this step may not apply to post-paid subscribers. Alternatively, the step 102 may apply, but the authorization/accounting system 24 may simply respond with a positive message in the next step for all post-paid subscribers, since there is no notion of "pre-paid balance" for such subscribers. Nevertheless, in the case of a post-paid subscriber, such authorization may still be beneficial to see if the user is allowed data access or not or to review policy rules associated with the types of data access the user is allowed, e.g., with respect to how much time or what bandwidth the user has signed up for.

Assuming the account has a sufficient available balance, in step 103, the authorization system 24 returns an appropriate message or signal to the proxy 22 indicating that permission to proceed has been granted. As indicated earlier, for post-paid subscribers, suitably no balance checks are made. Rather, such subscribers may be summarily granted access for data networks. In response, at step 104, the data request is forwarded or otherwise sent from the proxy 22 over the Internet 30 (or other suitable data network) to the web server 32 for which it was originally intended.

In step 105, the content, document and/or other response from the web server 32 to the received data request is returned over the Internet 30 to the proxy 22 where it is cached, e.g., while steps 106 and 107 are carried out. In step 106, a debit request is sent from the proxy 22 to the pre-paid system 24 instructing the pre-paid system 24 to debit the subscriber's account in accordance with the appropriate charges for retrieving the data from the web server 32. Suitably, the pre-paid system 24 complies with the debit request, and in step 107, returns confirmation of a successful debit to the proxy 22. Again, steps 106 and 107 may be simplified for post-paid subscribers; whereby the accounting system 24 just makes a note of the data transaction (time, quantum, type of data—normal or premium content, etc.) for generating a post-paid billing record and step 107 is a summary signal to the proxy 22 to proceed.

Without the content insertion or replacement features disclosed in the present specification, at step 112, in response to receiving the debit confirmation, the proxy 22 forwards or otherwise sends the original cached webpage, content, document or other data to the mobile device 10 over the mobile/wireless network 20.

In an alternative embodiment for post-paid subscribers or users, the proxy 22 may not get prior permission or authorization from the pre-paid system 24, rather, the processing of a data request is slightly different. In particular, for post-paid subscribers, the proxy 22 generally does not get prior permission or authorization from the pre-paid system 24. That is to say, the aforementioned steps 102, 103, 106 and 107 are not carried out. Rather, a call detail or other similar record is produced by the proxy 22 for each data request processed. Periodically, the records are offloaded to a billing system, e.g., via a billing mediation system. Suitably, the billing system charges the post-paid account as appropriate.

In any event, as can be appreciated, the proxy 22 presents a convenient point at which advertising or other like content can be inserted and/or replaced by the wireless service provider insomuch as the webpage, document and/or other like content originally provided by the website or web server 32 passes through and/or is at least temporarily cached by the proxy 22 for both pre-paid and post-paid subscribers. Suitably, the content insertion and/or replacement is carried out by an appropriate agent or engine 26 operatively connected to the proxy 22. In one embodiment, the ad insertion engine 26 may be co-located with the proxy 22 on the same physical platform. However, it is to be noted that these are logically distinct entities. In either case, targeting of the inserted or substitution content to the particular mobile device (in this case, the mobile device 10) is suitably achieved via a preference database (DB) 28 that the engine 26 consults and/or otherwise accesses, e.g., in real time. Suitably, the DB 28 contains information about a subscriber's likes and dislikes, general interests and such. This DB 28 is communicatively coupled with the engine 26 and provides responses to the queries, e.g., in real time. Additionally, one or more ad selection fields are included in the DB 28 to aid in properly targeting ads to various subscribers. Suitably, ad selection may be regulated by a number of factors, e.g.: the number of displays desired by the ad provider, the time period of display (from— to) desired by the ad provider, demographic data of the subscriber (e.g., it may be undesirable to show an ad for an R-rated film to a minor), etc.

In any event, recall that in step 107, the proxy 22 receives confirmation that the appropriate debiting has been achieved by the pre-paid system 24, or alternately in the case of a post-paid subscriber, that a suitable call record has been established for offloading to the billing system. However, in this case (i.e., when the content insertion/replacement feature of the present approach is enabled and/or otherwise utilized), rather than simply jumping to step 112 (wherein the mobile device 10 is forwarded or sent the cached webpage, document or other like content originally provided to the proxy 22 by the website or server 32), the proxy 22 instead responds to the confirmation received in step 107 by initiating a content insertion and/or replacement phase of the process. That is to say, following step 107, at step 108 the proxy 22 forwards or otherwise sends the webpage, document or other like content received from the website or server 32 to the engine 26. Suitably, in addition to the content, the proxy 22 also provides the engine 26 with an identification of the mobile device 10 that initiated the data request, e.g., the IP address of the mobile device 10 and/or the mobile identity, such as MSISDN (Mobile Subscriber Integrated Services Digital Network Number), among possibly other things including, but not limited to, the mobile device's characteristics.

At step 109, in accordance with one mode of operation, the engine 26 queries the DB 28 using the IP address of the mobile device 10. Suitably, the DB 28 correlates various IP addresses with particular geographical regions, e.g., cities. Accordingly, in response to the query presented in step 109, at step 110 the corresponding geographical region is returned to the engine 26. This enables, for example, location based content substitution and/or insertion to be performed by the engine 26. In another embodiment, optionally, a query to a HLR (Home Location Register) or HSS (Home Subscriber Server) associated with the network 20 may be used to determine the region in which the mobile device 10 is currently located.

In another mode of operation and/or other embodiment, step 109 may also entail the engine 26 employing the mobile device's telephone number or id in connection with the DB query. For example, the telephone number or id of the mobile device 10 is optionally obtained by querying the PDP (Packet Data Protocol) context (in the case of GSM/GPRS/UMTS networks) or the PPP (Point-to-Point Protocol) session context (for CDMA networks), which are generally held at the SGSN (Serving GPRS Support Node) or PDSN (Packet Data Serving Node), respectively. Alternately, this information (i.e., the mobile device telephone number and/or id) can also be obtained from a AAA (Authentication, Authorization and Accounting) server or a DHCP (Dynamic Host Configuration Protocol) server associated with the mobile/wireless network 20. In any case, the DB 28 optionally also correlates the numbers or ids of various mobile devices to preference and/or subscriber profiles. Accordingly, the response in step 110, not only returns a geographical region fix for the mobile device 10 but also a profile maintained in the DB 28 for the mobile device subscriber. Suitably, the profile optionally indicates any of a number of various preferences of the subscriber with respect to any of a number of subjects, e.g., dining, music, movies, entertainment, travel, etc. In one option, the preferences are published by the subscriber or otherwise made available by the wireless service provider, or alternately the preferences may be estimated or otherwise determined by the wireless service provider from observations of the subscriber's habits, patterns and/or routines that are monitored by the wireless service provider while the subscriber is using the mobile/wireless network 20. In one embodiment, the proxy 22 may even hint at the specific ad type to be served by specifying a keyword in its query to the ad-insertion engine 26.

As can be appreciated, following step 110, the engine 26 now has: A) the original webpage, document and/or other like content provided by the website or server 32; (B) a general geographical location of the requesting mobile device 10; and optionally, (C) a preference and/or subscriber profile for the requesting device 10. Accordingly, the engine 26 either inserts additional content or replaces selected content from the original document or webpage with new content based upon items (B) and/or (C), depending upon the particular mode of operation being employed. Optionally, the added or substitute content can be hosted locally at the engine 26, or alternately, it may be available from yet another platform, e.g., a suitable ad server. More specifically, for example, a tag line or the like may be added to the end or bottom of the original document/webpage. In another case, advertisements detected and/or otherwise identified in the original webpage/document may be replaced, e.g., with targeted advertisements that are more relevant to the location of the mobile device 10 and/or preferences of the subscriber. Finally, following the adjustment or modification of the webpage/document by the engine 26, in step 111 the engine 26 returns or otherwise sends the altered webpage/document back to the proxy 22 which in turn forwards or sends the altered webpage/document to the mobile device in step 112.

It is to be appreciated that, generally, for WAP (Wireless Access Protocol) access, WML (Wireless Mark-up Language) is commonly the "markup language" used to describe the original source content. As is generally known in the art, WML is like HTML (Hypertext Mark-up Language) in many respects, providing navigational support on the pages, which are typically referred to as "decks"—the deck generally being composed of many "cards", where each card represents an interactional entity that a user can operate on. Access to the web is generally provided via a WAP access gateway, which converts HTML pages into WML pages for rendition on mobile devices. For an HTTP (Hypertext Transfer Protocol) access, the source pages are generally composed in HTML. In order to accommodate a myriad number of different types of mobile terminals with different form factors and capabilities, W3C (i.e., the World Wide Web Consortium) has initiated a Device Independent Authoring Language (DIAL) forum. XDIME (Extensible HTML for Device Independent Markup Extensions) is an example of a DIAL. Pages created in XDIME allow a content adaptation engine to render these pages in real-time for specific devices, working with a database of device capabilities (e.g., based on UAProf (User Agent Profile) specifications or a suitable variant).

As discussed above, the engine 26 can operate in either of two modes, namely, a content-insertion mode and/or a content-substitution mode. In the insertion mode, the originally served document/webpage received from the server 32 at the proxy 22 is modified by the engine 26 to contain additional content. Alternately, in the substitution mode, existing content (e.g., an original ad) is replaced by new content (e.g., a new ad).

As can be appreciated, operation of the insertion mode is generally pretty straightforward. Each originally served page, e.g., constructed in HTML, has a header and a body. In its simplest form, the engine 26 operating in content-insertion mode, modifies the document body to include the desired additional content, e.g., an advertisement, tag line, etc. This added content, e.g., may or may not be based on subscriber preference or the mobile device's location. For example, this decision is optionally driven by one or more factors, such as:

the availability of the mobile number to the insertion engine 26 as described above;
the availability and/or access to subscriber preferences or other suitable profile; and,
the availability of ads or other content that is in line with the user preference and/or subscriber profile.

For purposes of illustrating the content-insertion mode of the engine 26, an example is given below. Assuming the original document is as follows:

```
<head>
<title> Space Age Monkeys </title>
...
...
</head>
<body>
<h1> Genus - Rhesus </h1>
...
...
</body>
```

Then the engine 26 operating in the content-insertion mode may optionally insert, e.g., an ad, specifying a proportional and/or fixed width so that a user agent can render the ad incrementally rather than waiting for the entire information to come in first. The relevant addition, for example may look like:

```
<body>
<h1> Genus - Rhesus </h1>
<p> <img src="Zoo.gif" alt="Visit Columbus Zoo" width="100%"
height="10%"/></p>
...
...
</body>
```

As can be appreciated from the present example, the inserted ad here spans the entire width of the mobile device and takes up 1/10 of its vertical space.

For content-substitution, the processing is more involved. Nevertheless, suitable observation of typical webpage layouts provides some insights as to the common placement of advertisements. In particular, ads often appear:

at the top of a page;
at the bottom of a page;
in a left pane on their own;
in the right pane on their own (e.g., as is typically observed on pages provided by some popular search engines); and,
interspersed in the document, while the document/page otherwise preserves a fixed layout.

Accordingly, the engine 26 optionally looks in any of these defined locations of ad that can be replaced. However, given the form factor of mobile devices, page layouts that uses multiple panes, or intersperse ads within the document (e.g., which tend to be more prevalent in book format, multi-column page layouts, etc.) are often not ideal for content-substitution. Therefore, in one optional embodiment, the engine 26 examines the body of the document and looks for, ads located at the top and the bottom of the page. Suitably, to identify an ad, the engine 26 looks for tell-tale signs, e.g., like the inclusion of a link and setting out or defining image boundaries from within the body of the HTML page. For example, below is an example page (the document header is not shown):

```
<body>
<table width="100%" border="0" cellspacing="0"
cellpadding="0">
    <tr>
        <td class="headerAds">
<script type="text/javascript"><!--
google_ad_client = "pub-8977534826041056";
google_ad_width = 728;
google_ad_height = 90;
google_ad_format = "728x90_as";
google_ad_type = "text_image";
google_ad_channel ="8449727755";
google_color_border = "ffffff";
google_color_bg = "ffffff";
google_color_link = "f6921d";
google_color_url = "636466";
google_color_text = "636466";
//--></script>
```

In this example, there is set aside a full width (denoted by table width="100%") advertisement space, of which, the actual ad would occupy 728 pixels by 90 pixels. Suitably, the modified page would, for example, look like:

```
<body>
<table width="100%" border="0" cellspacing="0"
cellpadding="0">
    <tr>
    <img src="Zoo.gif" alt="Visit Columbus
Zoo" width="728" height="90" />
```

While not necessarily shown in the above examples, in practicing both the content-insertion and content-substitution modes of operations, the new content or ad location within the document is properly identified in the page, and the actual path (FQDN/URI) of the content or ad is to be specified in the modified page. Additionally, it is advantageous if the source document adheres to DIAL specifications, then both content selection and content inclusion are greatly facilitated. Similarly, content adaptation can be greatly facilitated by the use of DISelect clauses. Both of these may provide additional hints to the engine 26 while parsing the document.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

The invention claimed is:

1. A method for altering content of a webpage served from a content provider's server, said method comprising:
   (a) receiving a data request at a proxy server maintained by a wireless service provider over a wireless telecommunication network, said data request being initiated by a mobile device served by the wireless network;
   (b) forwarding the request from the proxy server to the content provider's server over the Internet such that the content provider's server returns a webpage with original content contained therein in response to the forwarded request;
   (c) receiving the returned webpage at the proxy server;
   (d) determining a location of the mobile device based at least on an IP address, telephone number, or mobile identity for the mobile device;
   (e) altering the original content of the webpage received by the proxy server via a content alteration engine based on the following criteria: the data request; a subscriber profile accessible by the wireless service provider; a mobile device location; and specific policies maintained for specific subscribers, the altering comprising at least one of: (i) adding new content to the webpage; and (ii) replacing at least some portion of the original content with new content; wherein the new content varies based upon the determined location of the mobile device; and,
   (f) forwarding the webpage with the altered content to the mobile device initiating the data request.

2. The method of claim 1, wherein prior to step (b), the proxy server determines if a pre-paid subscriber of the mobile device has a sufficient balance in their account to cover fulfillment of the data request.

3. The method of claim 2, wherein prior to step (e), the proxy server notifies a pre-paid accounting server to debit the subscribers account for fulfillment of the data request, and receives confirmation of the debit from the pre-paid accounting server.

4. The method of claim 3, said method further comprising: caching the webpage received from the content provider's server at the proxy server.

5. The method of claim 1, said method further comprising: obtaining an IP address for the mobile device; and, determining a location of the mobile device based upon the IP address.

6. The method of claim 1, wherein step (e) further comprises:
   identifying an advertisement in the original content; and,
   replacing the identified advertisement with a new advertisement.

7. The method of claim 1, said method further comprising: obtaining one of a telephone number for the mobile device; and, determining a subscriber preference from based upon the telephone number.

8. A telecommunication network that supports altering content of a webpage served from a content provider's server, said network comprising:
   a mobile portion used by a mobile device to wirelessly access the network;
   a proxy server maintained by a wireless service provider that receives a data request from the mobile device over the mobile portion of the network and forwards the request to the content provider's server over the Internet such that the content provider's server returns to the proxy server a webpage with original content contained therein in response to the forwarded request; and,
   a content alteration engine that receives the webpage with the original content from the proxy server, alters the original content of the webpage, and returns the webpage with altered content to the proxy server, which in turn forwards the same to the mobile device that initiated the data request, wherein the original content of the webpage is altered based on the following criteria: the data request; a subscriber profile accessible by the wireless service provider; a mobile device location; and specific policies maintained for specific subscribers, wherein the content alteration engine operates to perform at least one of: (i) addition of new content to the webpage; and (ii) replacement of at least some portion of the original content with new content; and the new content varies based upon a determined location of the mobile device, wherein the location of the mobile device is determined based at least on an IP address, telephone number, or mobile identity for the mobile device.

9. The network of claim 8, said network further comprising:
   a pre-paid accounting system, wherein prior to forwarding the request to the content provider's server, the proxy server queries the pre-paid accounting system to determine if a pre-paid subscriber of the mobile device has a sufficient balance in their account to cover fulfillment of the data request.

10. The network of claim 9, wherein the prior to content alteration engine altering the original content, the proxy server notifies the pre-paid accounting server to debit the subscribers account for fulfillment of the data request, and receives confirmation of the debit from the pre-paid accounting server.

11. The network of claim 10, wherein said proxy server also caches the webpage received from the content provider's server.

12. The network of claim 8, wherein the location of the mobile device is determined based upon an IP address of the mobile device.

13. The network of claim 8, wherein the content alteration engine identifies an advertisement in the original content, and replaces the identified advertisement with a new advertisement.

14. The network of claim 13, further comprising: a preference database that contains preferences of subscribers such that the new advertisement is selected based upon the preferences in the database for a particular subscriber and other constraints imposed by the advertiser, wherein the constraints comprise one or more of counts of display, validity period, validity time, and a null constraint.

15. The network of claim 13, wherein advertisement replacement is regulated by one or more of the following factors: a number of displays desired by an advertisement provider, a time period of display desired by an advertisement provider, demographic data of the subscriber.

16. The method of claim 6, wherein advertisement replacement is regulated by one or more of the following factors: a number of displays desired by an advertisement provider, a time period of display desired by an advertisement provider, demographic data of the subscriber.

17. The method of claim 1, wherein step (e) further comprises:
   specifying a proportional and/or a fixed width for a new advertisement; and
   rendering the new advertisement incrementally.

18. The method of claim 1, wherein step (e) further comprises:
   altering the original content of the webpage received by the proxy server based on the availability of the mobile device to a content alteration engine.

19. The method of claim 1, wherein step (e) further comprises:
   receiving from the proxy server an identification of the mobile device that initiated the data request and characteristics of the mobile device.

20. The network of claim 8, wherein the content alteration engine is operative to:
   specify a proportional and/or a fixed width for a new advertisement; and
   render the new advertisement incrementally.

21. The network of claim 8, wherein the content alteration engine is operative to:
   alter the original content of the webpage received by the proxy server based on the availability of the mobile device to the content alteration engine.

22. The network of claim 8, wherein the content alteration engine is operative to:
   receive from the proxy server an identification of the mobile device that initiated the data request and characteristics of the mobile device.

\* \* \* \* \*